Jan. 5, 1932.  F. J. HEINZ  1,839,965
TRACTOR GUIDE
Filed July 30, 1930   2 Sheets-Sheet 2
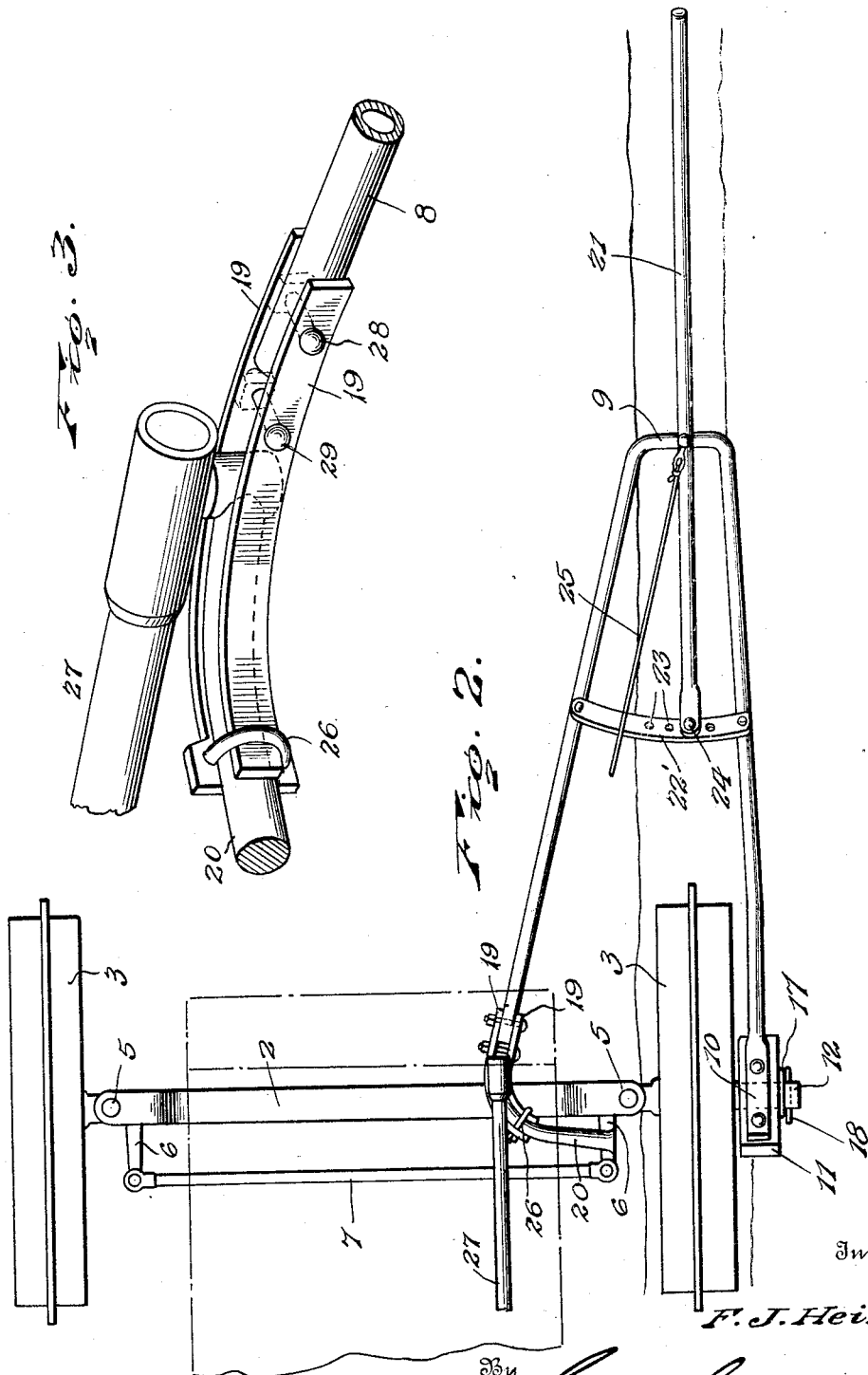

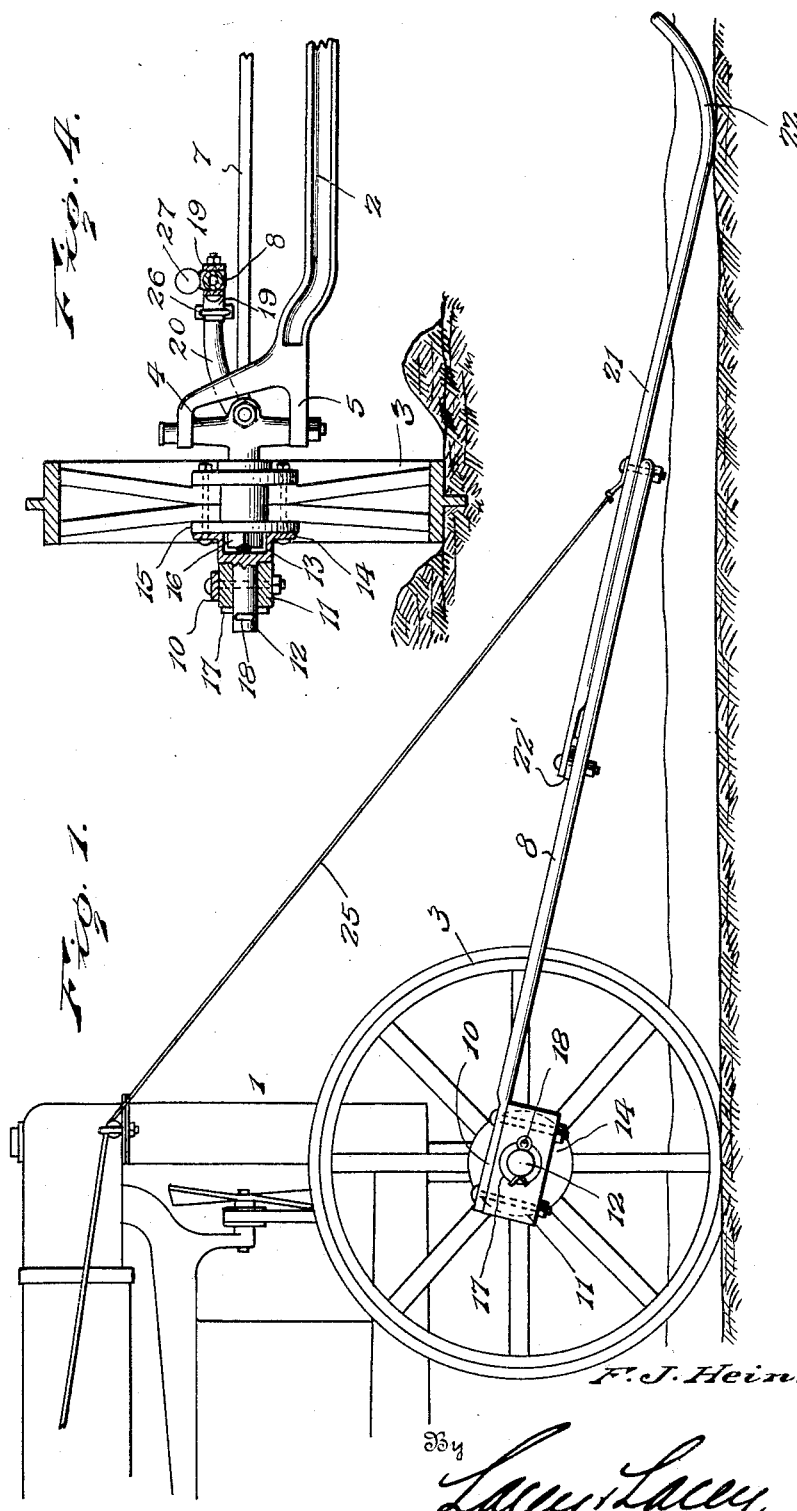

Patented Jan. 5, 1932

1,839,965

UNITED STATES PATENT OFFICE

FRED J. HEINZ, OF FOWLER, KANSAS, ASSIGNOR OF ONE-HALF TO JOSEPH E. LUNZ, OF BELPRE, KANSAS

TRACTOR GUIDE

Application filed July 30, 1930. Serial No. 471,794.

The object of this invention is to provide a very simple, inexpensive and efficient device to be mounted upon a tractor employed in tilling operations and engaged in a previously formed furrow for guiding the tractor in parallelism with said furrow whereby subsequently formed furrows will be parallel throughout their lengths with previously formed furrows. The invention is illustrated in the accompanying drawings and will be hereinafter first fully described and then more particularly defined in the appended claims.

In the drawings:

Figure 1 is a side elevation of a portion of a tractor showing my improved guide mounted thereon, Fig. 2 is a plan view of the same, Fig. 3 is a detail perspective showing the connection between one member of the guide and the tractor steering gear, and Fig. 4 is a view, partly in front elevation and partly in vertical section, showing the manner of connecting the guide to the tractor steering wheel and steering gear.

The tractor, indicated at 1, may be of any known or approved form and is provided with an axle 2 at the ends of which are mounted steering ground wheels 3 carried by suitable axles projecting outwardly from vertically disposed spindles 4 which are pivotally mounted in yokes 5 formed on the axle. At the inner sides of the spindles 4 are radius arms 6 which usually project rearwardly and are connected by a tie rod 7, one of the radius arms being geared to the steering element upon the tractor whereby the operator controls the direction in which the tractor will ordinarily travel.

In carrying out the present invention, there is provided a frame 8 which consists of two side bars or members converging forwardly and connected at their front ends by a cross bar 9 which may be conveniently formed integral with said side bars. The outer side bar 8 has its rear end flattened, as shown at 10, and secured upon the upper side of a bearing block 11 which is fitted upon a stub axle 12 formed at its inner end with a socket or cap 13 having side flanges 14 which fit against the hub cap of the tractor wheel, shown at 15, and over the axle nut 16, as clearly shown in Fig. 4, the stub axle being thereby disposed in alinement with the axle about which the wheel rotates. The block 11 is formed between its ends with an opening through which the stub axle 12 passes so that the block may rotate in a vertical plane easily about the stub axle and the block is held on the stub axle by a washer 17 and a cotter key 18, as will be readily understood and as shown clearly in Figs. 1 and 4. The rear end of the inner side member of the frame 8 is pivotally secured between the front ends of plates or jaws 19 which are clamped at their rear ends to a crank or lever arm 20 which is made integral with or rigidly secured to the adjacent radius arm 6 and extends inwardly and forwardly therefrom. The plates 19 are secured to the crank 20 by a clip 26 and to the front end of the crank is pivotally connected the front end of the steering rod 27. The side bar of the frame is pivotally secured by a horizontal bolt 28 so that it may accommodate itself to the rough bottom of a furrow or crevice but all lateral movement will be transmitted to the plates and the steering gear. A bolt 29, at the rear of the bolt 28, prevents spreading of the plates 19.

A guide bar or runner 21 is mounted upon the frame 8 and extends forwardly therefrom, the front extremity of said guide bar being turned upwardly, as shown at 22, whereby it may readily move forwardly along the bottom of a furrow without digging into the same and thereby clogging the forward travel of the apparatus. The guide bar 21 is pivotally mounted upon the cross bar 9 of the frame 8 at a point in direct alinement with the steering ground wheel 3 and the rear end of the guide bar is movable over an arcuate connecting bar 22' which extends between and has its ends secured to the side bars of the frame 8. A plurality of openings 23 is formed through this bar 22' and a pin or bolt 24 is inserted through the rear end of the guide bar and a selected one of said openings 23 so as to adjust the guide bar to compensate for possible variations in the alinement of the ground wheel. A cable 25 is attached to the guide bar or to the frame 8 and extends upwardly and rearwardly therefrom to be secured at some point on the tractor convenient to the operator so that the guide may be raised out of the way when its use is not desired.

The action will, it is thought, be readily understood from the foregoing description, taken in connection with the accompanying drawings. The guide bar is a comparatively narrow member so that it may readily pass down in a narrow furrow and engage against the sides of the same. As long as the furrow is substantially parallel with the central longitudinal line of the tractor, there will be no lateral movement in the guide bar 21 but when the furrow is out of parallelism with the line of travel the forward end of the guide bar will impinge against the wall of the furrow and will be thereby deflected laterally which will cause a corresponding movement of the frame 8 and inasmuch as the frame 8 is secured to the stub axle 12 which is rigidly secured upon the hub of the wheel, the wheel will be turned angularly and the angular movement will be transmitted through the radius arm and its connection to the ground wheel at the opposite side of the tractor so that the tractor will follow the path of the guide bar and, consequently, the furrows subsequently formed will all be parallel with the previously formed furrows. As the inner side member of the guiding frame is connected to the radius rod of the tractor steering gear and the point of attachment is the same distance from the pivot 5 as the journal block 11, there is perfect balance between the forward and back pressure exerted upon the guiding wheel, and as the furrow-engaging arm projects a considerable distance in front of the frame, the tractor may be made to veer from a direct line by a small crevice and the steering will be very easily accomplished. The device is very simple and is not apt to get out of order and may be produced and installed at a very low cost.

Having thus described the invention, I claim:

1. A tractor guide comprising a frame having side members adapted to pass at opposite sides of the tractor ground wheel and project forwardly beyond the same, a guide bar pivoted at the front end of said frame and adjustably connected at its rear end to the frame, and means for connecting one side of the frame with the outer side of the tractor ground wheel and the other side of the frame with the tractor steering gear.

2. A tractor guide comprising a frame having side members adapted to be secured at opposite sides of a tractor ground wheel and project forwardly therefrom, a guide bar pivoted at the front end of said frame and projecting forwardly beyond the same, a cross bar on the frame at the rear of its front end, a plurality of openings formed in said cross bar in an arcuate series concentric with the pivotal point of the guide bar, and means carried by the rear end of the guide bar to selectively engage said openings.

3. A tractor guide comprising a frame having side members adapted to be disposed at opposite sides of a tractor guide wheel, a guide bar mounted on said frame and projecting forwardly beyond the same, a stub axle secured to the outer side of the hub cap of the tractor ground wheel, a block mounted upon said stub axle to rotate in a vertical plane about the same, means for securing the rear end of the outer side member of the frame upon said block, a lever arm secured to the tractor steering gear and projecting forwardly and inwardly therefrom, and clamp plates secured to the inner end of said arm, the end of the inner side bar of the frame being pivoted between the front ends of said plates.

In testimony whereof I affix my signature.

FRED J. HEINZ. [L. S.]